(12) United States Patent
Suhoza et al.

(10) Patent No.: US 6,184,262 B1
(45) Date of Patent: *Feb. 6, 2001

(54) BENZOTRIAZOLE STABILIZERS FOR POLYOLS AND POLYURETHANE FOAM

(75) Inventors: Richard A. Suhoza; Thomas J. Karol, both of Norwalk, CT (US); James J. Talbot, Paris (FR)

(73) Assignee: R. T. Vanderbilt Company, Inc., Norwalk, CT (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/934,556

(22) Filed: Sep. 22, 1997

(51) Int. Cl.$^7$ ............... C08J 9/00; C08K 3/20; C08K 5/34; C08L 75/00
(52) U.S. Cl. ............... 521/90; 252/401; 252/405; 252/182.29; 521/95; 521/128; 521/129; 521/155; 521/159; 521/170; 524/87; 524/91; 524/589; 524/590; 568/582
(58) Field of Search .................. 568/582; 252/401, 252/405, 182.29; 524/87, 91, 589, 590; 521/90, 95, 129, 128, 145, 159, 170

(56) References Cited

U.S. PATENT DOCUMENTS

| | | |
|---|---|---|
| 3,637,865 | 1/1972 | Haring ............... 260/611.5 |
| 4,007,230 | 2/1977 | Hinze . |
| 4,177,155 | 12/1979 | Popplewell et al. . |
| 4,228,247 | 10/1980 | Moore et al. ............... 521/107 |
| 4,407,882 | 10/1983 | Hauser et al. . |
| 4,444,676 | 4/1984 | Statton et al. . |
| 4,701,273 | 10/1987 | Brady et al. . |
| 4,721,744 | 1/1988 | Ishii et al. ............... 524/91 |
| 4,734,209 | 3/1988 | Phillips et al. . |
| 4,880,551 | 11/1989 | Doe . |
| 4,933,374 | 6/1990 | Suhoza et al. . |
| 5,023,137 | * 6/1991 | Smith et al. ............... 428/34.1 |
| 5,219,892 | 6/1993 | Suhoza . |
| 5,238,606 | 8/1993 | Downs et al. . |
| 5,344,860 | * 9/1994 | Pastor et al. ............... 524/119 |

* cited by examiner

Primary Examiner—Patrick D. Niland
(74) Attorney, Agent, or Firm—Baker Botts, L.L.P.

(57) ABSTRACT

Polyether and polyester poloyols and polyurethane foams are stabilized by including therein stabilizers selected from (1) diphenylaminomethylbenzotriazole substituted by alkyl or phenylalkyl groups or (2) synergistic compositions consisting of (a) benzotriazole or alkylbenzotriazole and (b) secondary aromatic amine substituted by alkyl or phenylalkyl groups wherein the benzotriazole and amine is present in critical ratios.

Furthermore, a method is disclosed for preparation of polyurethane foams from polyols and polyisocyanate that have reduced discoloration due to scorch by adding diphenylamino methylbenzotriazole or compositions of benzotriazole and secondary aromatic amine as scorch inhibitors to the polyol, foaming the polyol and curing.

16 Claims, No Drawings

BENZOTRIAZOLE STABILIZERS FOR POLYOLS AND POLYURETHANE FOAM

BACKGROUND OF THE INVENTION

The present invention concerns stabilization of polyether polyols and polyester polyols and the use of the stabilized polyols in the preparation of polyurethane foam. In particular the invention relates to stabilization of polyols with benzotriazole stabilizer compositions and the color or scorch inhibition of flexible, semiflexible and rigid polyurethane foams made from the stabilized polyols.

In the production of polyurethane foam from polyether polyols and polyester polyols, discoloration or scorch occurs during processing and production of the foam in the form of slabs, buns or other shapes. The foam becomes scorched under certain reaction conditions and severely degrades the physical properties of the product. The scorch manifests as discoloration at the center of the bun and can range from slight yellow to dark brown, rendering the foam unsuitable for commercial use. Furthermore, some bun foams become discolored or scorched when removed hot from the production line and stored in stacks due to heat dissipation from the center of the stack.

To prevent discoloration during processing and storage, scorch inhibitors are added to the polyol. Scorch inhibitors prevent degradation of the foam during the exotherm curing step when most of the degradation takes place, as well as during storage of the foam.

Prior art discloses the use of aromatic amine type scorch inhibitors, as for example in U.S. Pat. No. 3,637,865. Some commercial aromatic amines contain free amine which is liberated during processing of the polyol and, even in low quantities, is undesirable in the workplace atmosphere because of worker health and environmental considerations.

Aromatic amine scorch inhibitors are employed in conjunction with other stabilizers such as triesters of 1,3,5-tris (2-hydroxyethyl)-s-triazinetrione disclosed in U.S. Pat. No. 4,228,247.

Surprisingly, it has been discovered that certain benzotriazole compounds enhance the oxidative stability of polyether polyols and polyester polyols and furthermore, provide good scorch inhibiting properties to polyurethane foam. Moreover, benzotriazole and its alkyl derivatives can be combined with aromatic amines in relatively low ratios to form synergistic scorch inhibitors.

SUMMARY OF THE INVENTION

According to the invention, there are provided polyoxyalkylene polyether polyol and polyester polyol compositions stabilized against oxidative degradation with a stabilizing amount of benzotriazole compounds of formula I

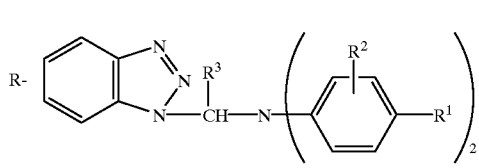

(I)

wherein R is hydrogen or lower alkyl, $R^1$ is alkyl or phenylalkyl, $R^2$ is $R^1$ or hydrogen, and $R^3$ is alkyl having up to 11 carbon atoms or hydrogen.

According to another aspect of the invention, there are provided polyether polyol and polyester polyol compositions stabilized against oxidative degradation with a stabilizing amount of a synergistic mixture of (1) benzotriazole compound of formula II

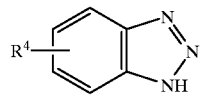

(II)

wherein $R^4$ is hydrogen or lower alkyl and (2) aromatic amine of formula III

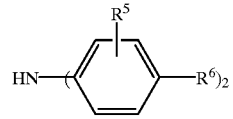

(III)

wherein $R^6$ is alkyl or phenylalkyl and $R^5$ is $R^6$ or hydrogen, and the weight ratio of the benzotriazole to the amine is from about 50:50 to about 90:10.

An object of the invention is to provide a method for the stabilization of a polyether polyol and polyester polyol against oxidative degradation comprising adding to the polyol about 0.01 to 5.0 percent by weight of a benzotriazole compound of formula I described hereinabove.

Another object of the invention relates to a method for stabilizing a polyether polyol and polyester polyol comprising adding a synergistic composition consisting of (1) a benzotriazole compound of formula II described hereinabove and (2) an aromatic amine of formula III described hereinabove wherein the weight ratio of the benzotriazole to the amine is from about 50:50 to about 90:10 and the synergistic composition is added in the amount of about 0.01 to 5.0 percent by weight based on the weight of the polyol.

This invention further relates to polyols stabilized by the method of this invention and to stabilized polyurethane foams prepared from such stabilized polyols together with polyisocyanates.

DETAILED DESCRIPTION OF THE INVENTION

The benzotriazole compounds of formula I

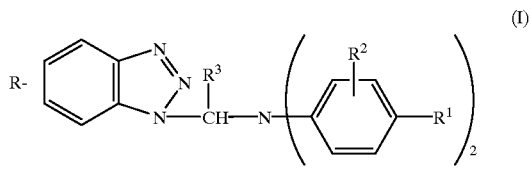

(I)

are prepared in a known manner from a benzotriazole, aldehyde and a secondary amine by means of the condensation reaction. The aldehyde may be formaldehyde, butyraldehyde, 2-ethylhexyl aldehyde or the like. Preferred are aldehydes having up to 12 carbon atoms. The benzotriazole may be substituted by a lower alkyl group to form tolutriazole compounds and the like.

The secondary amine reactant is selected from aromatic amines. Diphenyl amines may be substituted by alkyl groups or arylalkyl groups on the benzene rings. Particularly preferred are alkyl group substitutents having 1 to 24 carbon atoms. Exemplary amines from which the compounds are derived include, among others, octylated diphenylamine, nonylated diphenylamine, octylated aryl alkylated diphenylamine (VANOX® 830 available from R. T. Vanderbilt Company, Inc.), styrenated diphenylamine, 2,2'-diethyl-4,4'-(dimethylbenzyl) diphenylamine, 4,4'-dibenzyldiphenylamine, 4,4'-di(phenylethyl)diphenylamine. The secondary amine may be a mixed isomeric reaction product prepared by reacting diphenylamine, styrene and 2,4,4-trimethylpentene by known alkylating reaction methods to form essentially octylated diphenylamine. A similar mixed octylated diphenylamine is prepared by alkylating diphenylamine with 2,4,4-trimethylpentene. Nonylated isomeric reaction products are prepared by alkylation of diphenylamine with 1-propene trimer. Another alkylated diphenylyamine reaction mixture may be produced from 2-ethyl-N-(2-ethylphenyl)benzenamine and 1-propene trimer. The reaction mixtures contain some isomers, small amounts of monoalkylated and trialkylated diphenylamines. Preferred are alkylated diphenylamines containing no or only trace amounts of unreacted diphenylamine for an environmentally safer product.

The benzotriazole compounds of formula I are good scorch inhibitors when incorporated in the polyol precursors in an amount effective to produce the desired stability.

The benzotriazole compounds of formula II, which are used as precursors for the preparation of the compounds of the invention, possess no scorch inhibiting function. The benzotriazoles, however, show synergism when combined with secondary amines of formula III in a critical ratio. The synergistic scorch inhibiting function is effective for compositions containing a benzotriazole of formula II and a secondary amine of formula III in the weight ratio of the benzotriazole to the amine from about 50:50 to about 90:10. The preferred ratio of the benzotriazole to the amine is about 70:30 to 65:35. The benzotriazole synergists are compounds of formula II where $R^4$ is hydrogen or lower alkyl group. Preferred are benzotriazole and tolutriazole.

The aromatic amine synergists of formula III may be substituted by alkyl or arylalkyl groups on the benzene rings. The alkyl groups may have from 1 to 24 carbon atoms. The alkylated diphenylamines may be prepared by known methods. The alkylated diphenylamines may be in the form of isomeric reaction products prepared by alkylation methods described hereinabove.

The present synergistic compositions contain a relatively low proportion of the amine. It is, however, preferred that the alkylated diphenylamines contain no or trace amounts of free residual diphenylamine, to enhance the environmental safety of the product.

The compositions of the invention may be incorporated in the polyol precursors in an amount effective to produce the desired stability. Typically, an amount from about 0.01 to 5.0 percent will be sufficient. A preferred range is from about 0.3 to 1.0 percent by weight of the total polyol composition.

The stabilizer compositions may be diluted with mineral oil, paraffinic oil, petroleum oil, or vegetable oil for easier processing. The stabilizer composition may be incorporated into the polyol by simply stirring at ambient temperatures.

The polyol components which may be stabilized with the stabilizer composition of the invention include polyoxyalkylene polyether polyols having 2 to about 10 hydroxy groups. Particularly suitable polyols include those having a molecular weight of about 200 to 10,000 or higher. Preferred are polyols derived from diols and triols with a molecular weight ranging from 1000 for diols to 6000 for triols.

The polyether polyols possess two or more ether groups in the molecule. The polyols are derived from, among others, ethylene oxide, propylene oxide, epichlorohydrin, styrene oxide, diethylene glycol, triethylene glycol, trimethylolpropane, glycerine, hexanetriol, butanetriols and the like. Polyether polyols are suitable for preparation of flexible polyurethane foams.

Polyester polyols are derived from diols, such as ethylene glycol, polyoxyethylene glycol, dipropylene glycol, and polyoxypropylene glycol, and dicarboxylic acids, such as succinic acid, glutaric acid, adipic acid and piperic acid. Generally, polyester glycols having a molecular weight ranging from about 1,000 to about 8,000 are useful for preparation of the polyurethane foams of the invention. Commercial flexible foams are generally prepared from polyesters obtained from polydiethylene glycol and adipates, either linear or branched, and have molecular weight ranging from about 1000 to 3000.

In the preparation of polyurethane foams, the stabilized polyol compositions are reacted with a polyisocyanate compound containing two or more—N=C=O groups per molecule in the presence of catalysts, surfactants, water and optionally, auxiliary blowing agents. Commercially available polyisocyanates include, among others, toluene-(2,4 and/or 2,6)-diisocyanate, 4,4'-diphenylmethane diisocyanate, polyisocyanate from aniline-formaldehyde oligomers and aliphatic isocyanates such as methylcyclohexane diisocyanate and the like. Known surfactants of the silicone type are generally used for the foaming process. Commercially available catalysts are of the tin and amine type.

Because of increased safety considerations, flexible and semiflexible polyurethane may contain flame retardants. The latter are known compounds containing phosphorus, antimony, boron, bismuth and halogen or combinations thereof. The polyurethane may contain other additives such as fillers, plasticizers, reodorants, ultraviolet and thermal stabilizers and the like.

Preparation of the polyurethane foam is conducted by a known process. Foaming of the polyol/isocyanate formulation is conducted at ambient temperature and the subsequent curing of the foam at 120 to 205° C.

The data hereinbelow are intended to illustrate, but not to limit the scope of the invention. Unless otherwise stated, all parts and percentages in the specification and claims are expressed by weight.

EXAMPLE 1

Scorch resistance of polyurethane foams was determined by the microwave scorch test.

The samples given in Table I were prepared by mixing the ingredients in a high intensity mixer, pouring into 35×35×13.75 cm cardboard box and recording the cream and rise time (health bubbles). The foamed samples were placed in a 900 watt microwave oven at 40% power for 9.0 minutes, on a rotating dish. Thereafter, the samples were placed in a 121° C. forced air convection oven for two minutes to cure skin and then allowed to cure for 30 minutes at room temperature. The peak exotherm was measured for 10 minutes with a digital thermometer. The cured foam was cut open and discoloration was determined by visual inspection. Sample 1 contained no stabilizer and was severely discolored.

Other samples contained 0.5% scorch inhibitor of the invention based on the weight of the polyol. The scorch inhibitor was dissolved in about 50 to 60 percent paraffinic oil when incorporated in the polyol. The samples contained the following scorch inhibitors:

Sample 2: 1-(di(4-octylphenyl)aminomethyl)tolutriazole (hereinafter tolutriazole $C_8$-DPA);

Sample 3: Mixed octylated butylated diphenylaminomethyltolutriazole (hereinafter benzotriazole $C_4/C_8$-DPA);

Sample 4: Mixed octylated butylated diphenylaminomethylbenzotriazole (hereinafter benzotriazole $C_4/C_8$-DPA);

Sample 5: Nonylated diphenylaminomethyltolutriazole (hereinafter tolutriazole $C_9$-DPA);

Sample 6: Tetradecylated diphenylaminomethyltolutriazole (hereinafter tolutriazole $C_{14}$-DPA), a mixture of about 80% of monotetradecyldiphenylamino derivative and about 20% of ditetradecyldiphenylamino derivative; Sample 7: (styrenated diphenyl) aminomethyltolutriazole (hereinafter benzyltolutriazole).

TABLE I

| COMPONENTS | COMPOSITION, PARTS | | | | | | |
|---|---|---|---|---|---|---|---|
| | 1 | 2 | 3 | 4 | 5 | 6 | 7 |
| Polyether polyol[1] | 100.00 | 100.00 | 100.00 | 100.00 | 100.00 | 100.00 | 100.00 |
| Distilled water | 5.50 | 5.50 | 5.50 | 5.50 | 5.50 | 5.50 | 5.50 |
| Silicone surfactant | 1.20 | 1.20 | 1.20 | 1.20 | 1.20 | 1.20 | 1.20 |
| Amine catalyst[3] | 0.47 | 0.47 | 0.47 | 0.47 | 0.47 | 0.47 | 0.47 |
| Flame retardant[4] | 7.00 | 7.00 | 7.00 | 7.00 | 7.00 | 7.00 | 7.00 |
| Tin catalyst[5] | 0.25 | 0.25 | 0.25 | 0.25 | 0.25 | 0.25 | 0.25 |
| Toluene diisocyanate | 70.80 | 70.80 | 70.80 | 70.80 | 70.80 | 70.80 | 70.80 |
| Tolutriazole $C_8$-DPA | — | 0.5 | — | — | — | — | — |
| Tolutriazole $C_4/C_8$-DPA | — | — | 0.5 | — | — | — | — |
| Benzotriazole $C_4/C_8$ DPA | — | — | — | 0.5 | — | — | — |
| Tolutriazole $C_9$-DPA | — | — | — | — | 0.5 | — | — |
| Tolutriazole $C_{14}$-DPA | — | — | — | — | — | 0.5 | — |
| Benzyltolutriazole | — | — | — | — | — | — | 0.5 |
| Scorch | Very Severe | Very Light | Light | Light | Light | Light | Light |

[1]Arcol ® 16–52 manufactured by Arco Chemical Company
[2]NIAX ® L-5750 manufactured by OSI Specialties, Inc.
[3]NIAX A127 manufactured by OSI Specialties, Inc.
[4]FYROL FR 2 manufactured by Akzo
[5]DABCO ® T9 manufactured by Air Products Chemical Company

EXAMPLE 2

Scorch resistance of polyurethane foams was determined by the microwave scorch test described in Example 1. The results are compiled in Table II.

Samples 11 through 16 contained the synergistic two component scorch inhibitors of the invention and showed very good scorch resistance. Samples 8, 9 and 10 contained the individual components and showed very severe degradation.

The above embodiments and illustrations have shown various aspects of the present invention. Other variations will be evident to those skilled in the art and such modifications are intended to be within the scope of the invention as defined in the appended claims.

TABLE II

| COMPONENTS | COMPOSITIONS, PARTS | | | | | | | | |
|---|---|---|---|---|---|---|---|---|---|
|  | 8 | 9 | 10 | 11 | 12 | 13 | 14 | 15 | 16 |
| Polyether polyol[1] | 100.00 | 100.00 | 100.00 | 100.00 | 100.00 | 100.00 | 100.00 | 100.00 | 100.00 |
| Distilled water | 5.50 | 5.50 | 5.50 | 5.50 | 5.50 | 5.50 | 5.50 | 5.50 | 5.50 |
| Silicone surfactant[2] | 1.20 | 1.20 | 1.20 | 1.20 | 1.20 | 1.20 | 1.20 | 1.20 | 1.20 |
| Amine catalyst[3] | 0.47 | 0.47 | 0.47 | 0.47 | 0.47 | 0.47 | 0.47 | 0.47 | 0.47 |
| Flame retardant[4] | 7.00 | 7.00 | 7.00 | 7.00 | 7.00 | 7.00 | 7.00 | 7.00 | 7.00 |
| Tin catalyst[5] | 0.25 | 0.25 | 0.25 | 0.25 | 0.25 | 0.25 | 0.25 | 0.25 | 0.25 |
| Toluene diisocyanate | 70.80 | 70.80 | 70.80 | 70.80 | 70.80 | 70.80 | 70.80 | 70.80 | 70.80 |
| Tolutriazole | 0.5 | — | — | 0.375 | — | — | — | — | — |
| Benzotriazole | — | 0.5 | — | — | 0.375 | 0.35 | 0.325 | 0.30 | 0.275 |
| Octylated diphenylamine | — | — | 0.5 | 0.125 | 0.125 | 0.15 | 0.175 | 0.20 | 0.225 |
| Scorch | Very Severe | Very Severe | Severe | Light | Light | Very Light | Very Light | Light to Mod. | Mod. |

[1]Arcol ® 16–52 manufactured by Arco Chemical Company
[2]NIAX ® L-5750 manufactured by OSI Specialties, Inc.
[3]NIAX A 127 manufactured by OSI Specialties, Inc.
[4]FYROL FR 2 manufactured by Akzo
[5]DABCO ® T9 manufactured by Air Products Chemical Company

What is claimed is:

1. In the preparation of polyurethane foams by reacting a polyol and polyisocyanate compound in the presence of water, a catalyst and a surfactant, an improved method of reducing discoloration due to scorch of polyurethane foam comprising the steps of (i) adding to the polyol about 0.01 to 5.0 percent by weight of a stabilizer consisting essentially of a benzotriazole compound of the formula

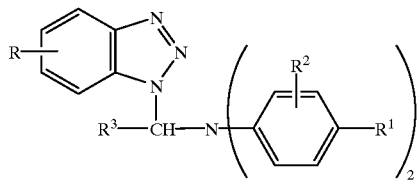

wherein R is hydrogen or lower alkyl, $R^1$ is alkyl or phenyalkyl, $R^2$ is $R^1$ or hydrogen and $R^3$ is hydrogen or alkyl having up to 11 carbon atoms, or mixtures thereof, (ii) stirring the polyol and stabilizer mixture at ambient temperature, (iii) foaming into foam at ambient temperature and (iv) curing at 120 to 205° C.

2. A method according to claim 1 wherein the benzotriazole compound is diluted with paraffinic oil prior to adding to the polyol.

3. In the preparation of polyurethane foam by reacting a polyol and polyisocyanate compound in the presence of water, a catalyst and a surfactant, an improved method of reducing discoloration due to scorch of polyurethane foam comprising the steps of (i) adding to the polyol about 0.01 to 5.0 percent by weight of a stabilizer composition consisting essentially of (1) benzotriazole compound of formula

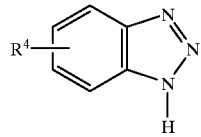

wherein $R^4$ is hydrogen or lower alkyl and (2) aromatic amine of formula

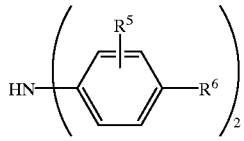

wherein $R^6$ is alkyl or phenyalkyl and $R^5$ is $R^6$ or hydrogen and the weight ratio of the benzotriazole to the amine is from about 50:50 to about 90:10, (ii) stirring the polyol and stabilizer mixture at ambient temperature, (iii) foaming into foam at ambient temperature and (iv) curing at 120 to 205° C.

4. A method according to claim 3 wherein the amine is alkylated diphenylamine.

5. A method according to claim 1 wherein the benzotriazole compound is 1-(di(4-octylphenyl)aminoethyl)tolutriazole.

6. A method according to claim 1 wherein the benzotriazole compound is alkylated diphenylaminomethyltolutriazole.

7. A method according to claim 1 wherein the benzotriazole compound is alkylated diphenylaminomethylbenzotriazole.

8. A method according to claim 1 wherein the benzotriazole compound is 1-(di(1,1phenylethylenephenyl)aminomethyl)tolutriazole.

9. A method according to claim 1 wherein the benzotriazole compound is present in the amount of 0.3 to 1.0 percent by weight based on the weight of the polyol.

10. A method according to claim 3 wherein the weight ratio of the benzotriazole compound to the amine is from about 70:30 to about 65:35.

11. A method according to claim 3 wherein the stabilizer composition is present in the amount of 0.3 to 1.0 percent by weight based on the weight of the polyol.

12. A method according to claim 4 wherein the alkyl group has 1 to 24 carbon atoms.

13. A method according to claim 12 wherein the alkylated diphenylamine is octylated diphenylamine.

14. A method according to claim 12 wherein the alkylated diphenylamine is nonylated diphenylamine.

15. A method according to claim 3 wherein the benzotriazole compound is benzotriazole.

16. A method according to claim 3 wherein the benzotriazole compound is tolutriazole.

* * * * *